«12» United States Patent
Sharpe et al.

(10) Patent No.: US 9,311,034 B2
(45) Date of Patent: Apr. 12, 2016

(54) DOCUMENT PRINTING SYSTEM AND METHOD

(71) Applicant: PATHWAY IP SARL, Luxembourg (LU)

(72) Inventors: Andre Sharpe, Founex (CH); James Mitchell, Trelex (CH); Cornelis Janse Lemmer, Gauteng (ZA); Jacques Christian Englebrecht, Bryanston (ZA)

(73) Assignee: PATHWAY IP SARL, Luxembourg (LU)

( * ) Notice: Subject to any disclaimer, the term of this patent is extended or adjusted under 35 U.S.C. 154(b) by 0 days.

(21) Appl. No.: 14/168,643

(22) Filed: Jan. 30, 2014

(65) Prior Publication Data

US 2015/0212763 A1 Jul. 30, 2015

(51) Int. Cl.
*G06F 3/12* (2006.01)
*G06K 15/02* (2006.01)

(52) U.S. Cl.
CPC .............. *G06F 3/126* (2013.01); *G06F 3/1203* (2013.01); *G06F 3/1207* (2013.01); *G06F 3/1222* (2013.01); *G06F 3/1238* (2013.01); *G06F 3/1267* (2013.01); *G06F 3/1282* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 5,930,465 | A * | 7/1999 | Bellucco et al. | 358/1.15 |
| 6,288,790 | B1 * | 9/2001 | Yellepeddy et al. | 358/1.15 |
| 7,457,878 | B1 * | 11/2008 | Mathiske et al. | 709/227 |
| 8,248,637 | B2 | 8/2012 | Dolan et al. | |
| 8,547,583 | B2 | 10/2013 | Dolan et al. | |
| 9,019,535 | B1 * | 4/2015 | Hansen | 358/1.15 |
| 2002/0196463 | A1 * | 12/2002 | Schlonski et al. | 358/1.15 |
| 2005/0138152 | A1 * | 6/2005 | Kruse | 709/223 |
| 2007/0177185 | A1 | 8/2007 | Ogura et al. | |
| 2009/0009802 | A1 * | 1/2009 | Shaw et al. | 358/1.15 |
| 2009/0070350 | A1 * | 3/2009 | Wang | 707/100 |
| 2012/0069385 | A1 * | 3/2012 | Von Hatten et al. | 358/1.15 |
| 2012/0137010 | A1 * | 5/2012 | Diehl et al. | 709/228 |
| 2012/0314246 | A1 * | 12/2012 | Jahn et al. | 358/1.15 |
| 2012/0327457 | A1 | 12/2012 | Hoshina et al. | |
| 2013/0061041 | A1 * | 3/2013 | Inoue | 713/156 |
| 2014/0198340 | A1 * | 7/2014 | Bailey | 358/1.15 |

OTHER PUBLICATIONS

"Welcome to Document Station." Regus, 2011. Web. May 21, 2014. http://doc.regus.com/documentwizard/DownloadSite/index.php.
International Search Report and Written Opinion from corresponding International Application No. PCT/EP2014/079268, dated Mar. 27, 2015.

* cited by examiner

*Primary Examiner* — Beniyam Menberu
(74) *Attorney, Agent, or Firm* — Lando & Anastasi, LLP (57) ABSTRACT

A document printing system configured to print documents received from a user device. The system comprises a remote server and a first local print server. The remote server is configured to communicate with one or more local print servers located on respective local networks, including the first local print server. The remote server receives print jobs from remote user devices and to maintain a global queue of print jobs. The first local print server is coupled to a first local network and to an input device for receiving user instructions. The first local print server receives print jobs from user devices, maintains a first local queue of print jobs, processes print jobs from the global queue of documents, and instructs a printing device to print a document in accordance with a print job, based upon user instructions received at the input device. The system is configured to determine whether the first local print server is accessible by a user device issuing a print job and, based on the determination, send the print job to the first local queue or to the global queue.

20 Claims, 8 Drawing Sheets

DOCUMENT PRINTING SYSTEM AND METHOD

TECHNICAL FIELD

Embodiments of the invention relate to systems and methods for printing documents from a user device such as a computer.

BACKGROUND

Modern demands on time require workers to be constantly available and able to access office equipment at any time in any location. It is desirable to be able to provide users with the devices that will allow them to print their documents at any of these locations. Existing systems may allow users to print locally to different printers over a local network connection, but may not allow a user to print from other locations when located away from the local network. Cloud printing systems allow remote printing but require relatively large amounts of data to be sent via the internet.

It would be desirable to be able to allow users to print to any number of different printing devices at various different locations in a more efficient manner.

SUMMARY OF INVENTION

The invention is defined in the claims to which reference is now directed. Preferred features are set out in the dependent claims.

Embodiments may provide a document printing system configured to print documents received from a user device. The system comprises a remote server and a first local print server. The remote server is configured to communicate, via the internet, with one or more local print servers located on respective local networks, including the first local print server. The remote server is further configured to receive print jobs from remote user devices and to maintain a global queue of print jobs. The first local print server is coupled to a first local network and to an input device for receiving user instructions. The first local print server is configured to receive print jobs from user devices, maintain a first local queue of print jobs, process print jobs from the global queue of documents, and instruct a printing device to print a document in accordance with a print job, based upon user instructions received at the input device. The system is configured to determine whether the first local print server is accessible by a user device issuing a print job and, based on the determination, send the print job to the first local queue or to the global queue. By providing a local queue on a local network local printing can be prioritised to avoid the need to send print data over the internet to a remote server.

Optionally, the print job is sent to the local queue if the first local print server is accessible by the user device, and the print job is sent to the global queue if the first local print server is not accessible by the user device.

The system optionally further comprises a user device which is configured to perform the steps of determining whether the first local print server is accessible by the user device, and based on the determination, to send the print job to the first local queue or to the global queue.

Optionally, determining whether the first local print server is accessible by the user device comprises determining whether the user device is connected to the first local network and whether a local print server is also connected to the first local network.

Determining whether the first local print server is accessible by the user device issuing the print job may further comprise determining whether a local network address that has been previously used by the user device to communicate with the first local print server is still valid, and if the local network address is still valid, sending the print job to the first local print server for inclusion in the first local queue. Determining whether the first local print server is accessible by the user device may additionally or alternatively further comprise determining whether the first local print server is accessible on the first network by using any suitable technique to test for the availability of, and identify, a network device. This can include attempting communication with an address associated with a pre-stored naming convention for local print servers using such techniques and, depending upon the response, if any, by the first local print server, sending the print job to the first local print server for inclusion in the first local queue. The first local print server may be one of a plurality of local print servers coupled to the first local network, one of the plurality of local print servers being a master server that maintains the first print queue and the other local print servers being slave servers, wherein the determining step includes attempting to establish communication with a device identified by the name associated with a master server based on the pre-stored naming convention.

Optionally the remote server may have access to a database containing the network addresses for a plurality of local print servers, including the first local print server. The step of determining whether the first local print server is accessible by the user device may then further comprise determining, at the remote server, whether the user device network address is within a range of addresses that includes the first local print server, and, if so sending the request to the first local print server.

Optionally the first local print server is one of a plurality of local print servers coupled to the first local network. The remote server may further have access to a database containing the network addresses for a plurality of local print servers, including the first local print server. Determining whether the first local print server is accessible by the user device issuing the print job may comprise determining whether a local network address that has been previously used by the user device to communicate with the first local print server is still valid, and if the local network address is still valid, sending the print job to the first local print server for inclusion in the first local queue, or if the local network address is not still valid, determining whether an alternate local print server is accessible on the first network by using any suitable technique to test for the availability of, and identify, a network device, including attempting communication based on a pre-stored naming convention for the local print servers. If an alternate local print server is accessible, the print job may be sent to the alternate local print server for inclusion in the first local queue, or if an alternate local print server is not accessible the remote server may be configured to determine whether the user device network address is within a range of addresses that includes the first local print server. If the user device network address is within the range of addresses, the print job may be sent to the first local print server, and if the user device network address is not within the range of addresses, the print job may be sent to the global queue.

The document printing system may be further configured to receive user identification information at the user input device. Based upon the user identification information the system may retrieve data identifying print jobs from the first local print queue and from the global print queue that are associated with the identified user. The system may then display, via a display device, the retrieved data identifying the print jobs, receive user instructions selecting one or more of the print jobs, and instruct the printing device to print the documents associated with the one or more print jobs.

The document printing system may further comprise one or more local interface devices that are associated with one or more printing devices, each local interface device having a user input device and configured to receive user identification information at the user input device and to retrieve, based upon the user identification information, data identifying print jobs from the first local print queue and from the global print queue that are associated with the identified user. The data from the local and global print queues may be obtained from the local print server. The local interface device may be further configured to display, via a display device, the retrieved data identifying the print jobs and to receive user instructions selecting one or more of the print jobs. The local interface device may then cause at least one of the associated printing devices to print the documents associated with the one or more print jobs. The one or more local interface devices may be communicatively coupled to the one or more printing devices and configured to instruct at least one of the printing devices to print the documents associated with the one or more print jobs. Alternatively the local print server may be the only device that is able to print to each printer and the local interface devices communicate with the master device to instruct it that a particular print job has been requested to be released by a user, the one or more local interface devices being configured to send data to the first local print server indicative of the one or more print jobs selected by the user and the first local print server being configured to then instruct at least one of the printing devices to print the one or more documents in accordance with the one or more print jobs.

The system may further comprise a plurality of local print servers, each coupled to respective local networks and configured to receive print jobs from user devices to print a document; maintain a local queue of print jobs; receive print jobs from the global queue of print jobs; and instruct a local printing device to print a document in accordance with a print job. The system may be further configured to identify the closest local print servers to the user on the user's user device.

The remote server may be further configured to: receive e-mail communications from user devices, the communications containing attached documents to be printed; and add a print job for an attached document to the global print queue. The first local print server may also then be configured to: receive user identification information; retrieve, based upon the user identification information, emailed print jobs from the global print queue associated with the identified user; receive user input selecting one or more of the emailed print jobs; and instruct the printing device to print the documents associated with the one or more print jobs.

The printing device may be a networked printer coupled to the first local network, having a local network address that is known to the first local print server and being invisible on the local network. The first local print server may be visible on the first local network and may store the network address of the printing device.

When the print job is sent to the first local queue the system may be further configured to: determine when an event has occurred indicating that a user associated with a print job has left the vicinity of the printing device; determine whether the user has requested the document associated with the print job be printed from the local queue; and based on the determinations, send the print job to the global queue. The system may further comprise an input device configured to receive input indicating that a user associated with a print job has left the vicinity of the printing device, the input device being a user terminal for receiving user input indicating that the user is leaving the vicinity. Alternatively, or in addition, the system may further comprise a sensor device configured to detect when a user associated with a print job has left the vicinity of the printing device.

The print job may include a rendered version of the document in an appropriate language for processing by a printer, such as a postscript or PCL file, along with appropriate metadata identifying one or more of the user, the file name, print preferences and so on. The rendered file may be created by the user device and stored as part of the print job at, or accessible by, the local or global print servers. Alternatively, rendering may take place at the printer itself or at the local print server. The document to be printed may then be stored in its original format, such as a ".pdf" or ".doc" format, or a compressed format, as part of the print job in the local or global print queues, and the rendering may then be performed subsequently, such as at the time of printing.

Embodiments may provide a method of printing a document from a user device. The method comprises receiving, at the user device, instructions to initiate a print job and determining, at the user device, whether a first local print server is accessible by the user device. If the first local print server is accessible by the user device, the print job is sent to a first local print queue maintained by the first local print server, the first local print server being coupled to a first local network and to an input device for receiving user instructions and being configured to instruct a printing device to print a document in accordance with a print job, based upon user instructions received at the input device. If the first local print server is not accessible by the user device, the print job is sent to a global print queue maintained by a remote server. The method may further comprise receiving, at the first local print server, input indicative of a user's identity; retrieving, from the local queue associated with the first local print server and from the global queue associated with the remote server, print jobs associated with the user; and instructing a printing device to print a document in accordance with a print job, based upon user instructions received at the input device of the first local print server.

Embodiments may also provide a corresponding user device, local print server and remote server for use in a document printing system

BRIEF DESCRIPTION OF THE FIGURES

Embodiments of the invention will now be described with reference to the accompanying figures in which.

DETAILED DESCRIPTION OF PREFERRED EMBODIMENTS

Embodiments of the invention will be described in relation to a document station device. A document station may comprise a local print server that is configured to allow a user to print documents using a printing device that is accessible by the document station. The printing device, which may simply be referred to as a printer, may be directly coupled to the document station (e.g., by cable), may be integral with the document station, or may be coupled to the document station via a network, particularly a local network such as a local area network (LAN) or virtual local area network (VLAN).

A user device, such as a laptop computer, mobile phone, smart phone, PDA or similar may be used to print documents at a document station by executing driver software and/or by emailing documents as will be described below. The document is sent to the document station, or to a global system connected to the document station by a wide area network such as the Internet, and can be released at the document station by providing user identification information to the document station.

Optionally, the document station may be configured to perform further functionalities such as copying, faxing and scanning documents by connecting to various different devices on the local network, or by connecting to a single multi functional device.

Figure 1:
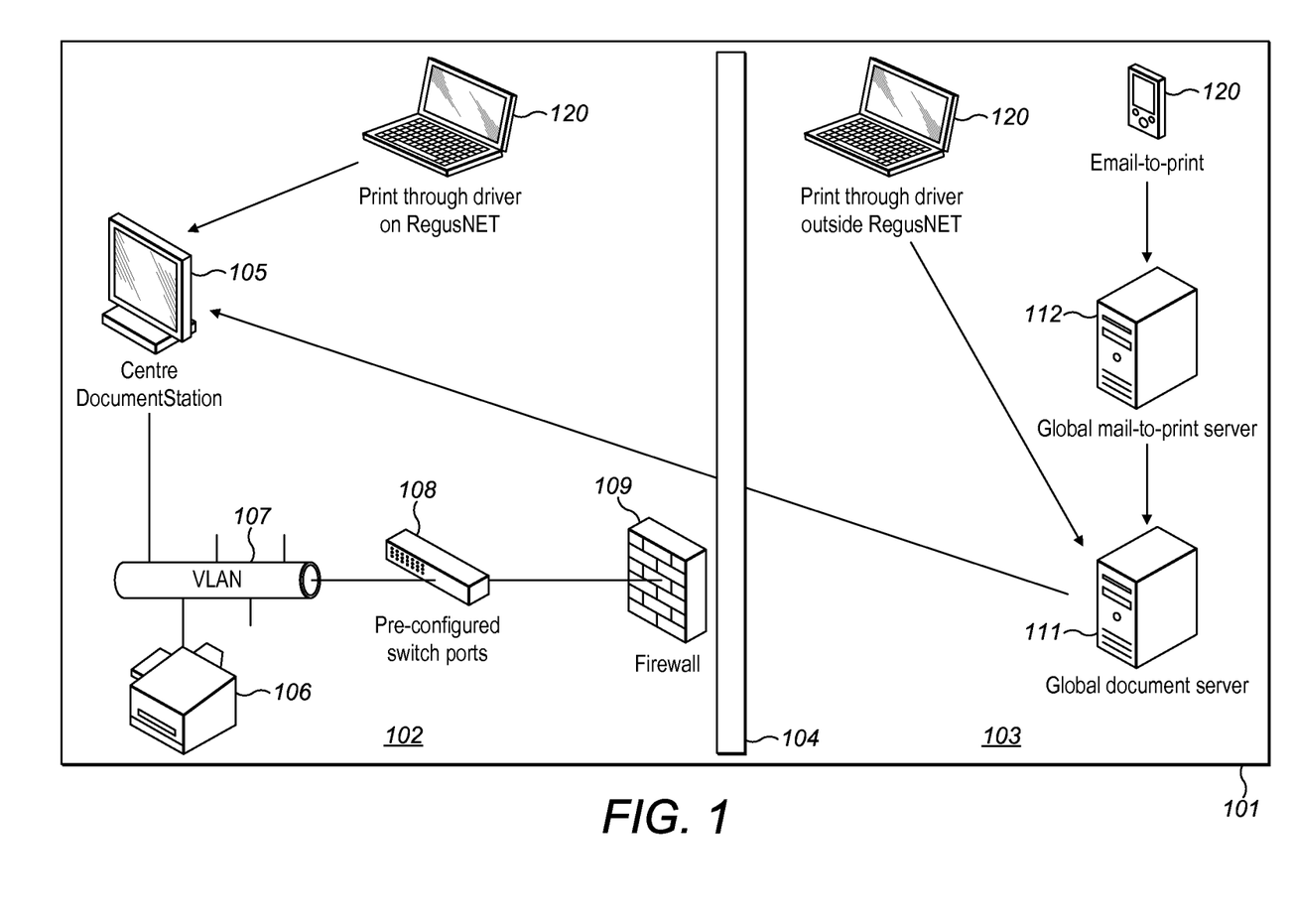
FIG. 1 is an example of a system according to the present invention.

FIG. 1 shows a system 101 according to an embodiment of the invention. The system can be broadly divided into a local side 102 and a remote or internet side 103 by an internet connection 104. The local side 102 comprises a document station 105 that is coupled to a printing device 106 via a local network connection, which may be a local area network or virtual local area network 107 for example. Optionally, a firewall 109 may be provided between the internet side and the local network, along with a switch arrangement or router 108. The internet side 103 comprises a remote or global server 111 which is able to communicate with the document station 105 via the internet. The internet side may also optionally comprise an additional e-mail to print server 112. The functionality of the global server 111 may be provided by a single physical server, a collection of servers or a cloud based or virtual server system. The functionality of the e-mail to print server 112 may also be combined with the global server.

The document station 105 may have a fixed IP address on the local network to which it is connected, and may be connected to the internet as shown. The document station 105 may be visible on the local network to other devices. The printing device 102 may have a fixed local IP address through which it can be accessed by the document station, this IP address being provided to the document station such that it can access the printing device. The printer 102 may not be visible on the local network to other devices.

In addition to the local side 102 shown, a plurality of other local sides may be provided each with their own document station and printing device coupled by a local area network. Each local side may have more than one document station connected to more than one printing device. The system provides a way for a user to print documents to any local printer using the local document station, and allows the prioritisation of local printing as will be described below.

Figure 2:
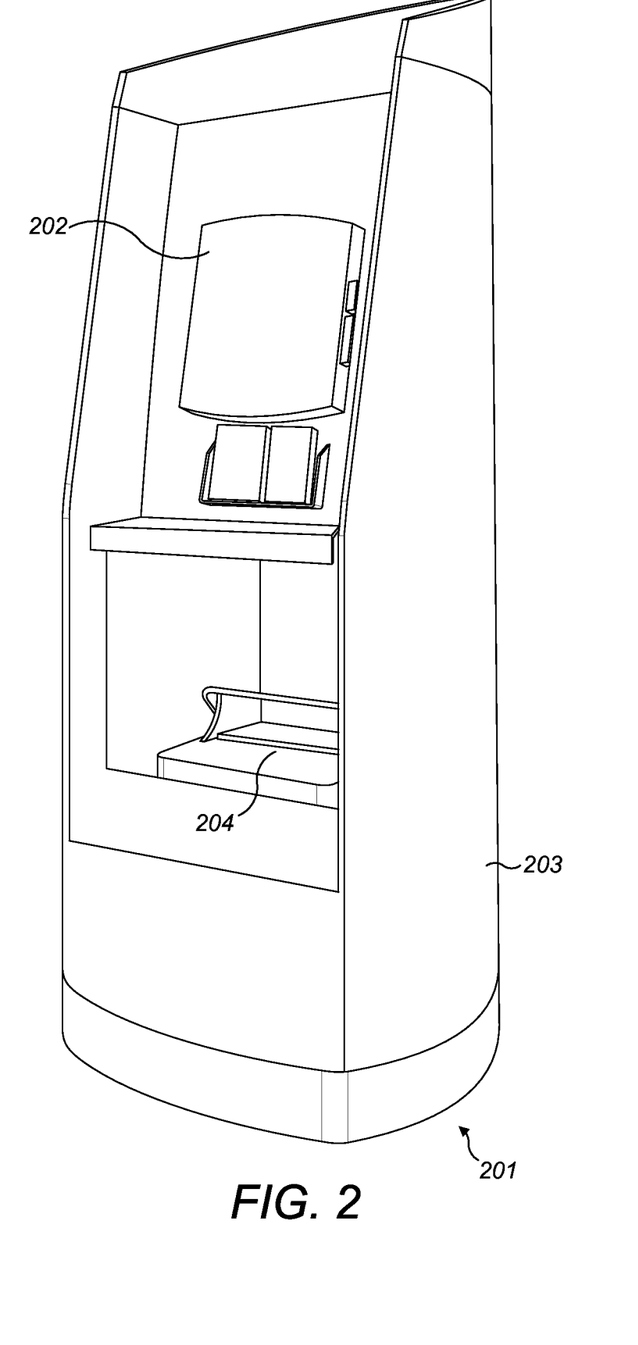
FIG. 2 is an example of a document station that may be used with embodiments of the invention.

FIG. 2 shows an example of a document station 201 that may be used with embodiments of the invention. The document station 201 is provided with a print server 202 mounted within a support structure 203. The print server has a user input or user interface device which may be in the form of a touch screen display and/or card-reader device. The print server 202 is coupled to a printer 204, which may also be mounted within the same support structure 203. The document station 201 can be provided within a room or at a particular location, such as an office-space, airport lounge, hotel lobby and so on.

To print a given document using the system a user device 120 is used. The user device may be connected to the local network of a document station 105, directly to the internet or indirectly to the internet, depending upon the user's location and connection options. For example, the user device may be connected wirelessly or by cable to the local network, or to the internet, by any suitable means, including via a local network or hub. The user device has installed on it appropriate print driver software, and the user may also need to provide identification information to the system on registration such that the system can associate print jobs with a given user. Identification information may be in the form of an email address for example, and may also include personal information and/or billing information such as credit card details so that print services can be charged for.

One or more documents are selected on the user's device and the driver software is used to send a print job. The print job is sent to a queue, which will be a local queue maintained by the document station, or a global queue maintained by the remote server 111, depending upon whether the user device is connected to a local network associated with a document station, or to a different network. The print job is associated with the user based on the user identification information provided on registration. In order to release the print job from the queue and physically print the document the user provides input to the local print server 105. In particular, the user provides identification information, which may be in the form of a password linked to their account, by swiping or presenting a card associated with the user at the card/RFID reader of the document station, or other appropriate identification mechanism such as near field communication (NFC) or biometrics. The document station then presents the user with a list of print jobs associated with their account, and provides the option to print one or more of these documents using the printer coupled to the document station by receiving user input selecting the relevant documents.

The document station is also configured to receive global print queue data from the remote server 103. Communications between the document station and the remote server may be initiated from the local print server by means of a request, relying on a "pull" mechanism as opposed to data being "pushed" down from the remote server to the local server. Therefore, a local print server may retrieve globally queued print jobs such that global jobs stored on, or accessible by, the remote server are downloaded when a user has selected them for printing. In this way, when the user views print jobs associated with their account at a local document station, they are able to view any of their print jobs that are stored on either the local queue or the global queue. A user can view any of their print jobs stored in the global queue at any document station, but can only see locally stored print jobs at the local document station associated with the particular local queue. Local printing may be prioritised over global printing, by which it is meant that it is preferable to store print jobs in a local queue and print from the local queue where possible, rather than sending requests and possibly also document data to the remote server, in order to save on global bandwidth and to make the printing process quicker for the user.

Figure 3:
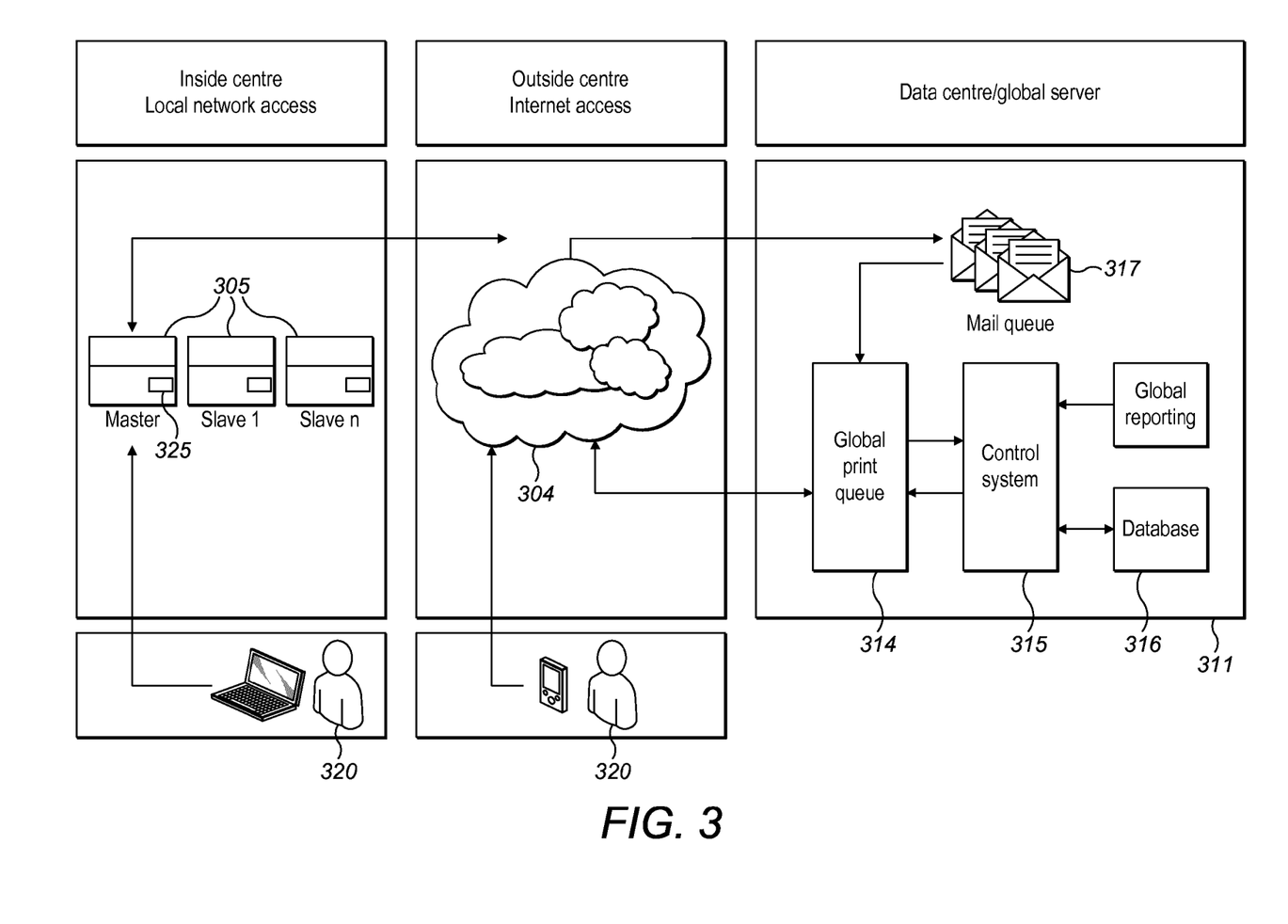
FIG. 3 is an example of an application of the system of FIG. 1.

FIG. 3 shows the system of FIG. 1 in the context of an office space centre that provides office space to users on a short term basis. Such locations are examples of locations that may require multiple document stations in order to satisfy user demand. A plurality of document stations 305 are provided within the centre, and connected to a network that is local to the centre such as a LAN or VLAN. Of the plurality of document stations 305, one document station 325 is designated as a master document station. Each of the document stations provides the user with the same functionality, but it is the master document station 325 that maintains the local print queue and that forwards print jobs to the remote server system for inclusion in the global print queue as described herein. Master document station 325 is able to access the internet 304. The global or remote server 311 is also connected to the internet and includes a global print queue 314, a central control system 315, a database or database connection 316 and an optional e-mail to print queue functional unit 317. The database contains user identification information and may be used to store user billing details so that customers can be charged on a per transaction/print job basis. A number of additional centres, each with their own local network and plurality of document stations may also be provided, each with the same connectivity to the global server 311.

As with the embodiment shown in FIG. 1 a user can request to print a document with their user device 320, which is connected to the local network of a centre or to the internet from outside the local network. Which connection is available will determine whether the print job is sent to the local queue managed by the master document station 325 of the centre in question, or to the global queue 314 managed by the global server 311. The master document station is able to receive global print queue data from the global print queue via the internet. The slave document stations, also referred to as local interface devices, may also be able to receive global print queue data, either directly from the global print queue via the internet or via the master document station, such that a user accessing their print queue at a local document station is able to access both local and global print jobs.

The queue to which a print job is sent is determined based upon whether the user device 120/320 is connected to a local area network or not, and whether that local area network has a document station connected to it or not. Preferably this determination is performed by logic operating on the user device. When a user selects to print a document a determination is made as to whether the user device is connected to a local area network and whether a local document station can be identified on that network. If a local document station is identified then the print job is sent to that local document station for inclusion in the local print queue. If the user device is not connected to the local area network, or there is no document station connected to the local area network, then the local lookup will fail. If this occurs then the print job is sent to the global queue maintained by the global server 111/311.

Figure 4:
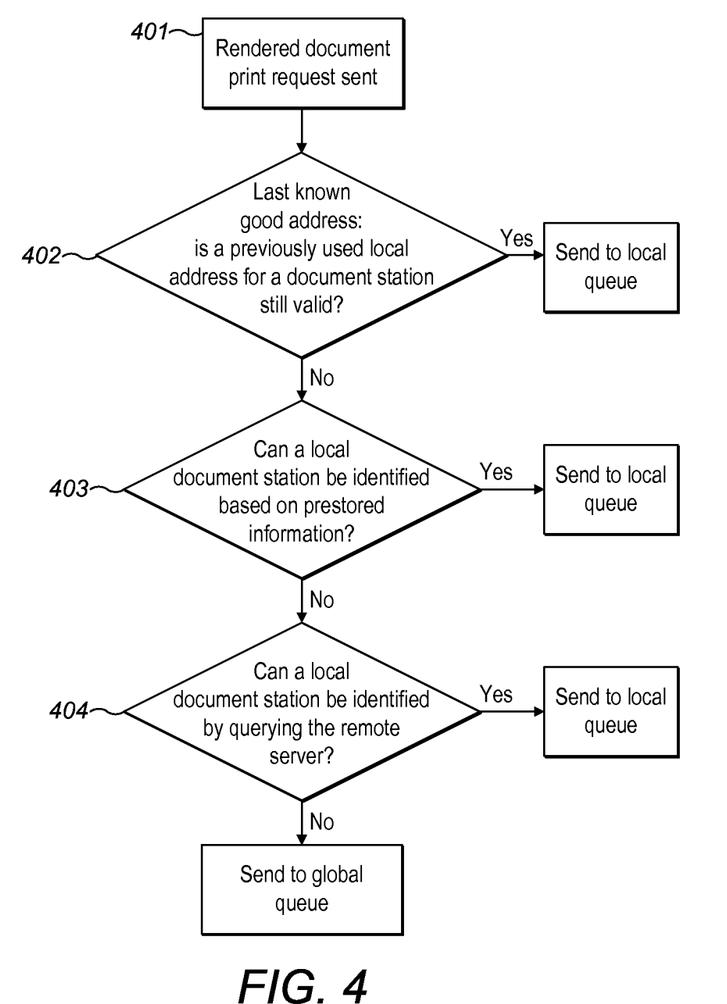
FIG. 4 is a flow diagram showing an example of the logical steps involved when deciding whether to send a print request to a local or global print queue.

FIG. 4 shows an example of the logical flow used by the user device to determine which queue to send a document print job to. To add a print job to a queue the rendered document and the queue address are required. A service is also needed that will save the job in the queue. The service (the receptacle of the print job) exists on each local master print server as well as the global server and may be a web based program for providing an interface that receives print jobs and adds them to respective local or remote queues. The service may be the same service for local and global queues.

The client driver, executing on the user device, may optionally be the software that carries the intelligence to decide what the address for the queue is, although this may be performed by another entity such as the print server or an intermediary device. In some embodiments of the invention this decision is made by performing a series of checks or steps as follows. A print job/request 401 is made by the user operating the user device. This is done, for example, by selecting the "print" option for a document in the standard way and selecting the option to use the printing system described herein, which may appear as a single selectable printer within the user interface.

A check 402 is then performed to determine if there is an address that the user device previously used for the queue of a local print server 105, and to determine whether this address is still valid. The validity check may be performed by using any suitable technique to test for the availability of, and identify, a network device. Such techniques could include one or more of: calling a web service, such as a SOAP or REST web service, and looking for a specific reply; using User Datagram Protocol (UDP) broadcasts; using Simple Network Management Protocol (SNMP); and pinging the previous local print server address and determining if a response is received. If a previously used address is valid then this address can be re-used for the print queue and the print job is sent there. If there is no previously used address, or if the previously used address (or addresses) are not valid, then further checks are performed.

The next check is to determine whether the user device is able to establish contact with a local print server based on pre-stored identification data. At step 403 the user device uses a pre-stored naming or labelling convention to attempt to discover or look-up a local print server on the local network. For example, there may be a standard labelling convention whereby local document stations or print servers are identified sequentially with network identification names. The first print server, which may be a master print server, may be named "DOCSTATION-01", the second named "DOCSTATION-02" and so on. This standard convention can be pre-programmed into the driver software executing on the user device, whereby the user device will check to see if a print server identified on the local network by a particular label or identifier can be contacted. The lowest sequentially numbered print server, or the print server that is expected, by virtue of its name, to be the master print server, in this example "DOCSTATION-01", can be checked and if it is present on the local network it can be used as the address for the print queue. Alternatively, the naming convention for the local print servers could be defined in the global print server or other accessible server and the local print servers configured to lookup and use the appropriate name. The determination as to whether contact can be made can again be performed using any suitable technique to test for the availability and identify of a network device as described above. If no contact can be established then further checks are performed.

The next check is to determine whether a document station/print server can be identified on the same local network as the user device by querying the remote server 111, which may store network address details for all local document stations, or at least for all local master document stations. At step 404 the network address of the local user device may be provided to the remote/global server 111, which compares that network address with the range of network addresses permitted for the local area network. If a local document station/print server exists within the range of network addresses permitted for the local area network then this indicates that the user device is connected to the same local network as the print server, which can then be used as the address for the print queue. For example, the print driver uses the IP address for the user device and queries the global server 111 to perform a gateway lookup to find the IP address of a local document station. The user device IP address may be 10.145.0.105. The global server 111 stores, or has access to, the IP addresses of all local master document stations, as well as the LAN/VLAN IP address ranges. For example, a local master document station may have an IP address 10.145.96.82 and the range of IP addresses permissible for the local network may be from 10.145.0.1 to 10.145.255.255. Therefore the local document station IP address appropriate for the user device will be 10.145.96.82. If the user device is able to connect to this IP address, it can be used as the address for the print queue.

If all the above checks fail, the user device can connect to the global address for the global print queue maintained by the global server 111. It should be noted that one or more of the checks described can be used without the others, and in any combination as desired.

The provision of local and global queues permits selective local printing, which is advantageous over global printing since local printing requires less bandwidth and fewer communications over the internet to the global server. Sometimes, however, a user may forget to release their print request at their local document station, or they may wish to print at a different document station in a different location. Embodiments may therefore include a mechanism for sending locally queued print jobs to the global queue for release at any document station at any location. This may be achieved by sending print jobs from the local queue to the global queue after a predetermined period of time has elapsed and the documents associated with the print jobs have not been printed, such as several hours, or one or more days for example. Alternatively, this may be achieved by sending print jobs from the local queue to the global queue at a predetermined time, such as 1 am every morning, or once a week. Alternatively, this may be achieved by monitoring or determining when the user has left the vicinity of the local document station or printing device with which their print request is queued, and if they leave before printing a document from the local print queue, sending the print job to the global print queue.

Determination as to whether the user has left the vicinity of the local document station may be achieved in different ways. When a user initiates a print job at a first location having a local document station the print request is sent to the local queue as described above. If the user then leaves that first location without printing the document from the local queue the print job will remain in the local queue. When the user arrives at a second location they may use a document station associated with that second location, different to the first location by virtue of the document station being connected to a different local network to the document station at the first location. Upon identifying themselves to the second document station a request may be sent to the global server 111/311 to determine if there are any outstanding locally queued print jobs contained in local queues maintained by other document stations. This may be achieved by the global server querying local document stations, or receiving updates from local document stations indicating which local queues contain print jobs associated with particular users. Any outstanding local print jobs can then be sent to the global print queue and the second document station is then able to retrieve the outstanding print jobs and display them to the user for selection and printing.

Alternatively, the room or location at which the local document station or stations is/are located may include one or more input or sensor devices for determining when a user has left the vicinity of the local document station or stations. In the vicinity of the local document station or stations there may be provided a user terminal for receiving user input indicative of whether the user is entering or leaving the vicinity of the document stations. The terminal may be a panel having a keyboard, touch screen interface, RFID, and/or card reader that allows the user to provide identification information to the terminal. For example, the user may present an RFID card associated with them to the terminal, which will read the data stored on the RFID card and use this to identify the user. The data from the terminal may be sent to the global server 111. As the user leaves the room or vicinity in which the document station is located they provide user input to the terminal indicating that they are leaving. The terminal then provides the input to the remote server, which can query the local print queue to determine if there are any outstanding print jobs associated with that user. If there are any outstanding print jobs they can be sent to the global queue for release at other locations. Alternatively the terminal input may be provided to the local master document station which will then forward outstanding locally queued print jobs to the remote server global queue as appropriate. It should be noted that the terminal may be provided for alternative purposes such as controlling door locks to allow registered users to access the room in which the document station or stations is/are located, and so embodiments may be using the terminal to provide a secondary functionality.

Figure 5:
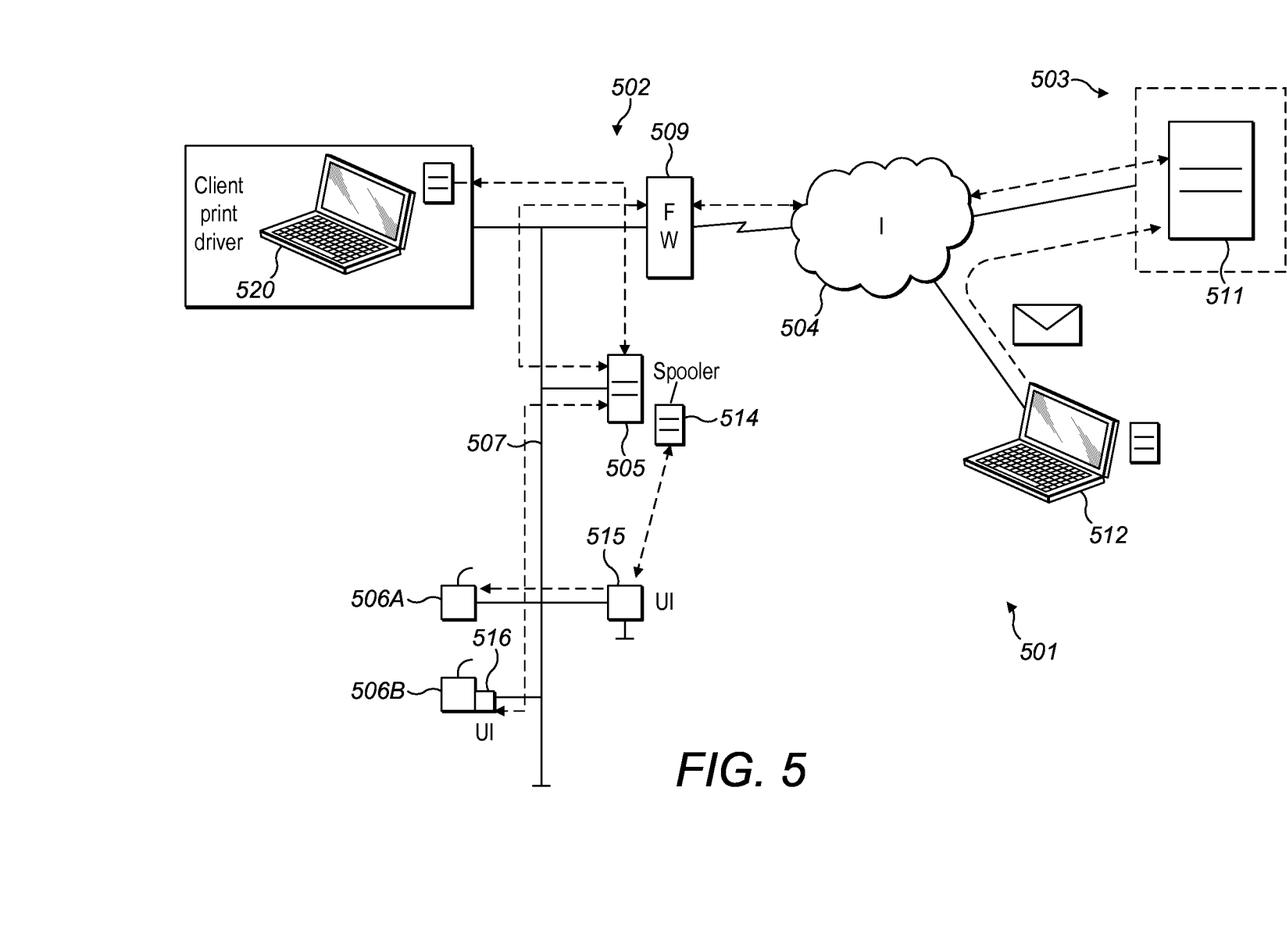
FIG. 5 is an example of a system according to the present invention.

FIG. 5 shows a further example of a system 501 according to an embodiment of the invention. The example of FIG. 5 functions in a similar manner to that of FIG. 1 and FIG. 3. As with FIG. 1, the system can be broadly divided into a local side 502 and a remote or internet side 503 by an internet connection 504. The local side 502 comprises a local print server 505 that is coupled to various printing devices 506A and 506B via a local network connection, which may be a local area network or virtual local area network 507 for example. Optionally, a firewall 509 may be provided between the internet side and the local network, along with a switch arrangement or router (not shown in FIG. 5). The internet side 503 comprises a remote or global server 511 which is able to communicate with the local print server 505 via the internet. The internet side may also optionally include an additional e-mail to print functionality, as described herein, allowing documents to be emailed to global server 511 by a user device 512 and queued in the global queue. As before, the functionality of the global server 511 may be provided by a single physical server, a collection of servers or a cloud based or virtual server system.

To print a given document a user device 520 is used. The print job is sent to a local queue 514 maintained by the local print server 505 or to a global queue maintained by the remote server 511, as described above. In order to release the print job from the queue and physically print the document the user must provide input to the local print server 505. The input can be provided via a user interface (UI), such as UIs 515 and 516, which may be provided on a computing device such as a tablet or integrated into a printer to use an onboard user interface device as a touch-screen. For example, UI 515 is connected to a printer 506A via the local network 507, and UI 516 is integrated into printer 506B. The UIs are configured to communicate over the local network with the local print server 505. Computing devices running the UIs may be termed "slave" devices, or local interface devices, since these devices optionally may not store any print job information but instead receive this from the local print server 505 which may be termed a "master" device. It is also possible for a UI to be executing on the print server 505 or on an interface device directly coupled to the print server.

Users can approach a slave device and provide user input, such as swiping a card, to identify themselves. The slave device then requests a list of print jobs from the local master device. The master device 505 may then also request a list of print jobs associated with the user from the global print server 511. The master device then sends a list of print jobs associated with the user, both locally and globally queued, to the slave device for presentation to the user. The slave device/document station, then presents the user with a list of print jobs associated with their account, and provides the option to print one or more of these documents using the printer coupled to the slave device, or integrated with it, by receiving user input selecting the relevant documents.

In an alternative embodiment, the master device 505 is connected to each local printer 505A/506B and is the only device that is able to print to each printer. In such an embodiment the slave devices do not communicate directly with their respective printers, but instead communicate with the master device to instruct it that a particular print job has been requested to be released by a user. The master device in turn communicates with the relevant printer to process and print the selected print job. In such an embodiment the UI/slave devices do not need to be able to communicate with their associated printer as printing is instructed via the master device.

Figure 6:
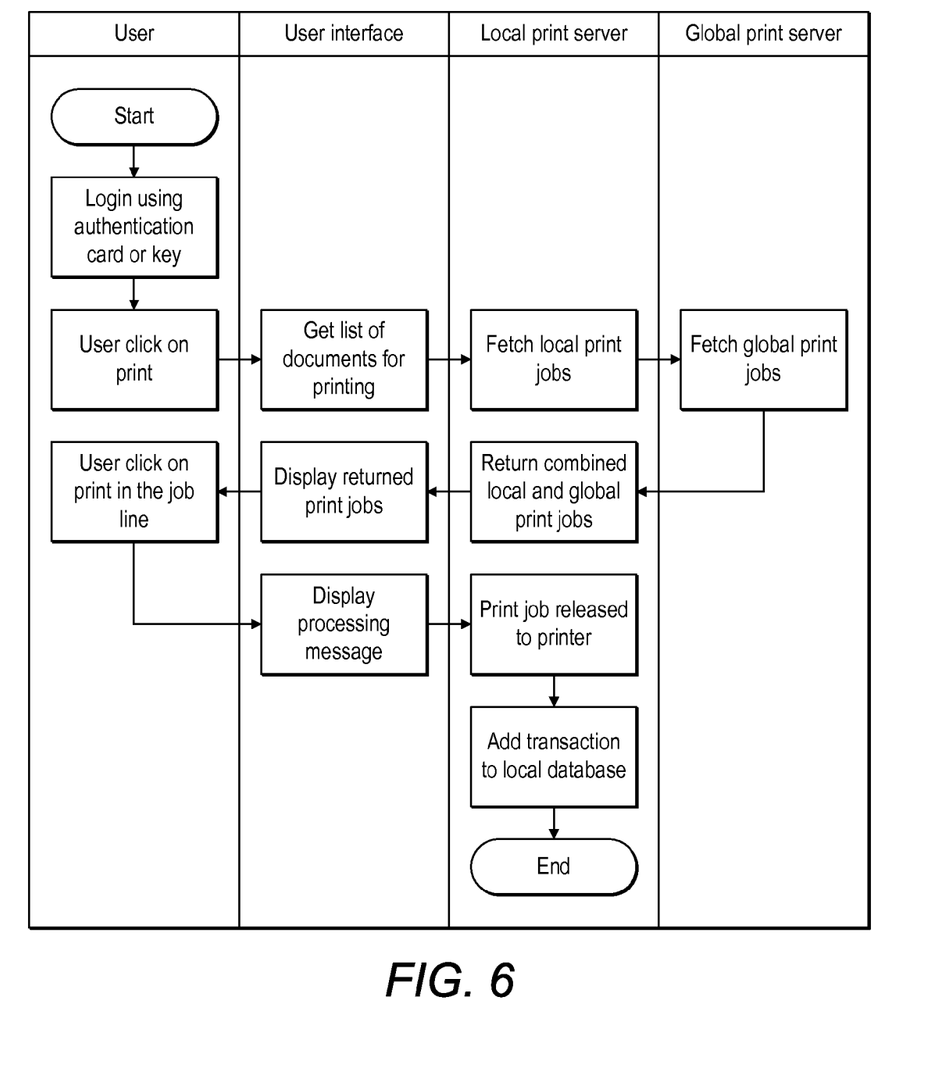
FIG. 6 is a flow diagram showing an example of the logical steps involved when processing a print job.

FIG. 6 shows an example of the logical flow applied to process a print job from a user interface operating on a slave or master device. The user logs into the system by providing identification data such as by scanning an authentication card, entering a key-code, or any other suitable method as described herein. The user selects the print option using the UI, which then fetches a list of documents in the print queue associated with the user. The local print server retrieves a list of local print jobs from the local print queue maintained by the master local print server and also queries the global print server to retrieve a list of globally queued print jobs associated with the user. A combined list is generated of both local and global print jobs which may then be presented to the user via the UI, optionally in a manner that does not distinguish between local and globally queued jobs. The combined list may sort entries by the time of the print job creation, for example in ascending order. The user then selects the job they wish to release to the printer. The local print server may also add charging information to the user's account by updating a local database, which may optionally be used to then update a global database to subsequently charge the user.

It should be noted that, in any embodiments described herein, where a list is presented to the user the list may contain data indicative of the print job, such as a document title, rather than the entire print job itself which may also contain the document to be printed in either a rendered format or in the original format of the document. The entire print job is only requested from the local print server 505 or from the global print server 511 when selected for printing by the user from the list.

The client driver, which may be running on the user device 520, may forward the print job to the local or global server in a particular print language, such as in postscript format or printer command language (PCL). The full print job may therefore include the postscript file along with appropriate metadata identifying one or more of the user, the file name, print preferences and so on. When a user prints a document in a particular format that document is rendered into the print language. The system may operate by intercepting the raw rendered data and packaging it with the client metadata so that it can be handled by the local or global print queues. In such examples it is the rendered file, for example a postscript file, that is stored in the local or global print servers. Alternatively, rendering may take place at the printer or at the local print server for example. The document to be printed may be stored in its original format, such as a ".pdf" or ".doc" format, at the local or global print queues, and the rendering may then be performed on the local print server at the time of printing. The original format is typically smaller in size than the rendered postscript documents and so this avoids transmitting excessive amounts of data to the local or global print queues, and from the global print queue to a local print queue.

A functionality referred to as "e-mail to print" will now be described. Email to print can be used whenever the user device has a connection to the internet, be that via a local network or otherwise. The user selects a document to be printed and emails it to a fixed global email address. The email address runs on a global email server such as server 112, the functionality of which may be incorporated within global server 111, which may be a cloud based or virtual server system. The email server 112 may act as a printing intermediary on behalf of the sender, which adds a print job to the global print queue maintained by the global server 111. The sender may receive a print release code via email, and may then release the print job by entering the print release code at a document station, such as by using an appropriate UI. The document to be printed is downloaded from the email server 112 or global server 111 at the document station on demand, once the user provides the appropriate input. Rather than associating the print job with a particular print release code, the user's email address may instead be associated with the user on a database accessible by the global server 111, which allows the user to simply identify themselves to a document station in order to access and release their print job sent via email.

Figure 7:
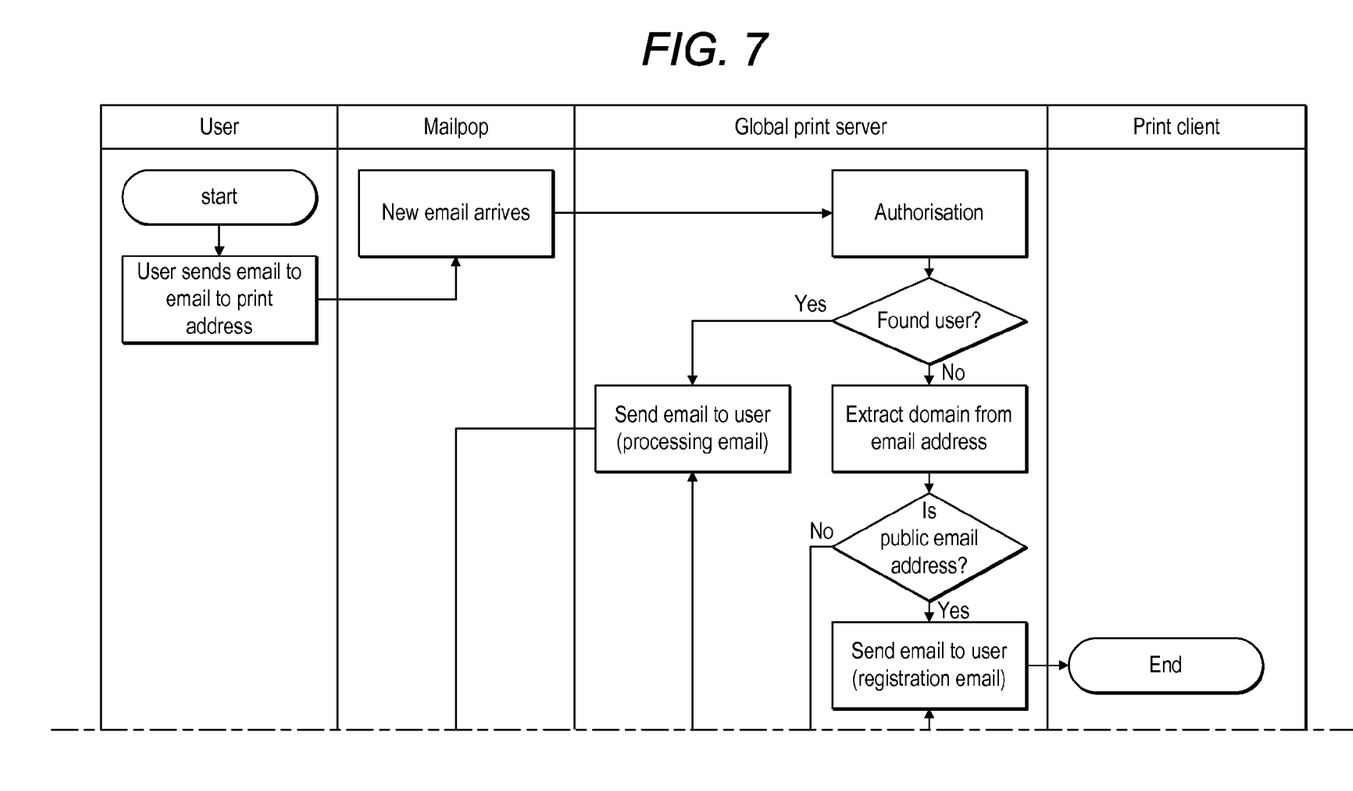
FIG. 7 is a flow diagram showing an example of the logical steps involved when using email to print functionality.

FIG. 7 shows an example of the logical flow applied to process an e-mail to print job from a user operating a user device. Upon receiving the email communication the global print server performs an authorisation process to determine if the user is identified in a database accessible by the global print server, the database identifying users that are authorised to use this functionality. Once authorisation has occurred the protocol may extract the document(s) to be printed from the email and send them to the print client, this may also include saving the body of the email accompanying the document(s). The protocol (e.g. Mailpop) will then initiate printing of the relevant parts using the client driver. An authorisation of the user's email address may optionally be performed and, if successful, the print client initiates printing of the documents, creating a print job in the global queue of the global print server in the same manner as described herein for printing using a global print queue. Once the document print job has been created, optionally including printing of the email body, the global print server may optionally send job authorisation data, such as a pin code, to the user. The job authorisation data may be sent to the user via email for example, and can be used by the user to release their print job. The print job can be released by inputting the pin code at a UI, such as UI 515 or 516. Alternatively, job authorisation may not be required. For example, the print job may be added to the global queue associated with the user and accessed in any of the manners described herein for accessing globally queued jobs.

Referring back to the authorisation procedure, if the user is not found in the global print server database containing details of authorised users then a number of additional steps may take place. The global server may extract the domain from the email and check to see if the domain is a public domain. For public domains the global server may send a registration email to the user containing registration instructions that need to be carried out before the process can continue. If the domain is not a public domain then a check is performed to determine if the number of registered clients for the domain is equal to one. If the number of registered clients for the domain is not equal to one then a registration email is sent to the user. If the number of registered clients for the domain is equal to one then the global server automatically registers the user, updating the database as appropriate, and the process continues.

E-mail to print may be used in isolation, or with any combination of the embodiments described herein. Whilst it has been described in relation to email messages, the same method may be used for any addressable electronic form of communication to which a document for printing can be attached or associated with.

What is claimed is:

1. A document printing system configured to print documents received from a user device, the system comprising:
   a remote server configured to:
      communicate, via the internet, with one or more local print servers located on respective local networks;
      receive print jobs from remote user devices; and
      maintain a global queue of print jobs;
   a first local print server, coupled to a first local network and to an input device for receiving user instructions, the first local print server being configured to:
      receive print jobs from user devices;
      maintain a first local queue of print jobs;
      process print jobs from the global queue of print jobs; and
      instruct a printing device to print a document in accordance with a print job, based upon user instructions received at the input device;
   wherein the system is configured to:
      determine whether the first local print server is accessible by a user device issuing a print job and, based on the determination, send the print job to the first local queue or to the global queue.

2. A document printing system according to claim 1 wherein the print job is sent to the local queue if the first local print server is accessible by the user device, and the print job is sent to the global queue if the first local print server is not accessible by the user device.

3. A document printing system according to claim 1 wherein the system further comprises a user device, the user device being configured to perform the steps of determining whether the first local print server is accessible by the user device, and based on the determination, sending the print job to the first local queue or to the global queue.

4. A document printing system according to claim 1 wherein determining whether the first local print server is accessible by the user device comprises determining whether the user device is connected to the first local network and whether a local print server is also connected to the first local network.

5. A document printing system according to claim 1 wherein determining whether the first local print server is accessible by the user device issuing the print job comprises:
   determining whether a local network address that has been previously used by the user device to communicate with the first local print server is still valid; and
   if the local network address is still valid, sending the print job to the first local print server for inclusion in the first local queue.

6. A document printing system according to claim 1 wherein determining whether the first local print server is accessible by the user device further comprises:
   determining whether the first local print server is accessible on the first network by attempting to establish communication with an address associated with a pre-stored naming convention for local print servers; and
   if communication is established, sending the print job to the first local print server for inclusion in the first local queue.

7. A document printing system according to claim 6 wherein the first local print server is one of a plurality of local print servers coupled to the first local network, one of the plurality of local print servers is a master server that maintains the first print queue and the other local print servers are slave servers, wherein the determining step includes attempting to establish communication with a device identified by the name associated with a master server based on the pre-stored naming convention.

8. A document printing system according to claim 1 wherein the remote server has access to a database containing the network addresses for a plurality of local print servers, including the first local print server, the step of determining whether the first local print server is accessible by the user device further comprising determining, at the remote server, whether the user device network address is within a range of addresses that includes the first local print server, and, if so sending the request to the first local print server.

9. A document printing system according to claim 1 wherein:
   the first local print server is one of a plurality of local print servers coupled to the first local network;
   the remote server has access to a database containing the network addresses for a plurality of local print servers, including the first local print server; and
   determining whether the first local print server is accessible by the user device issuing the print job comprises:
      determining whether a local network address that has been previously used by the user device to communicate with the first local print server is still valid; and
      if the local network address is still valid, sending the print job to the first local print server for inclusion in the first local queue; or
      if the local network address is not still valid, determining whether an alternate local print server is accessible on the first network by attempting to establish communication with based on a pre-stored naming convention for the local print servers; and
      if an alternate local print server is accessible, sending the print job to the alternate local print server for inclusion in the first local queue; or
      if an alternate local print server is not accessible, determining, at the remote server, whether the user device network address is within a range of addresses that includes the first local print server; and
      if the user device network address is within the range of addresses, sending the print job to the first local print server; and
      if the user device network address is not within the range of addresses, sending the print job to the global queue.

10. A document printing system according to claim 1 wherein the system is further configured to:
   receive user identification information at the user input device;
   retrieve, based upon the user identification information, data identifying print jobs from the first local print queue and from the global print queue that are associated with the identified user;
   display, via a display device, the retrieved data identifying the print jobs;
   receive user instructions selecting one or more of the print jobs; and
   instruct the printing device to print the documents associated with the one or more print jobs.

11. A document printing system according to claim 10 further comprising one or more local interface devices that are associated with one or more printing devices, each local interface device having a user input device and configured to:
- receive user identification information at the user input device;
- retrieve, based upon the user identification information, data identifying print jobs from the first local print queue and from the global print queue that are associated with the identified user;
- display, via a display device, the retrieved data identifying the print jobs;
- receive user instructions selecting one or more of the print jobs; and
- cause at least one of the printing devices to print the documents associated with the one or more print jobs.

12. A document printing system according to claim 11 wherein the one or more local interface devices are communicatively coupled to the one or more printing devices and are configured to instruct at least one of the printing devices to print the documents associated with the one or more print jobs.

13. A document printing system according to claim 11 wherein the one or more local interface devices are configured to send data to the first local print server indicative of the one or more print jobs selected by the user and the first local print server is configured to instruct at least one of the printing devices to print the one or more documents in accordance with the one or more print jobs.

14. A document printing system according to claim 1 the system further comprising a plurality of local print servers, each coupled to respective local networks and configured to:
- receive print jobs from user devices to print a document;
- maintain a local queue of print jobs;
- request print jobs from the global queue of print jobs; and
- instruct a local printing device to print a document in accordance with a print job.

15. A document printing system according to claim 14 wherein the system is further configured to identify and display the closest local print servers to the user on the user's user device.

16. A document printing system according to claim 1 wherein the remote server is further configured to:
- receive e-mail communications from user devices, the communications containing attached documents to be printed; and
- add a print job for an attached document to the global print queue;

wherein the first local print server is configured to:
- receive user identification information;
- retrieve, based upon the user identification information, emailed print jobs from the global print queue associated with the identified user;
- receive user input selecting one or more of the emailed print jobs; and
- instruct the printing device to print the documents associated with the one or more print jobs.

17. A document printing system according to claim 1 wherein:
- the printing device is a networked printer coupled to the first local network, having a local network address that is known to the first local print server and being invisible on the local network; and
- the first local print server is visible on the first local network and stores the network address of the printing device.

18. A document printing system according to claim 1 wherein when the print job is sent to the first local queue the system is further configured to:
- determine when an event has occurred indicating that a user associated with a print job has left the vicinity of the printing device;
- determine whether the user has requested the document associated with the print job be printed from the local queue; and
- based on the determinations, send the print job to the global queue.

19. A document printing system according to claim 18 wherein the system further comprises:
- an input device configured to receive input indicating that a user associated with a print job has left the vicinity of the printing device, the input device being a user terminal for receiving user input indicating that the user is leaving the vicinity.

20. A document printing system according to claim 18 wherein the system further comprises:
- a sensor device configured to detect when a user associated with a print job has left the vicinity of the printing device.

* * * * *